(12) United States Patent
Polanco et al.

(10) Patent No.: US 11,511,440 B2
(45) Date of Patent: Nov. 29, 2022

(54) OBJECT DETECTION TO ACTIVIATE PRESSURE SENSORS

(71) Applicant: Hewlett-Packard Development Company, L.P., Spring, TX (US)

(72) Inventors: Daniel Polanco, San Diego, CA (US); Matthew G. Lopez, San Diego, CA (US); William Meyer, San Diego, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 32 days.

(21) Appl. No.: 15/734,681

(22) PCT Filed: Nov. 16, 2018

(86) PCT No.: PCT/US2018/061578
§ 371 (c)(1),
(2) Date: Dec. 3, 2020

(87) PCT Pub. No.: WO2020/101703
PCT Pub. Date: May 22, 2020

(65) Prior Publication Data
US 2021/0229294 A1    Jul. 29, 2021

(51) Int. Cl.
*G01L 9/10*    (2006.01)
*G01L 19/00*    (2006.01)
*B25J 13/00*    (2006.01)
*B25J 13/08*    (2006.01)
*G01V 3/00*    (2006.01)

(52) U.S. Cl.
CPC ............... *B25J 13/081* (2013.01); *G01L 9/10* (2013.01); *G01L 19/00* (2013.01); *G01V 3/00* (2013.01)

(58) Field of Classification Search
CPC ... G01L 3/24; G01L 3/242; G01L 5/08; G01L 5/10; G01L 5/101; G01L 5/108; G01L 5/16; G01L 5/1627; G01L 5/167; G01L 5/22; G01L 5/28; G01L 23/085; G01L 23/20; G01L 5/0061; G01L 5/0071; G01L 5/008; G01L 5/06; G01L 5/171; G01L 7/106
USPC .................................................. 73/700–756
See application file for complete search history.

(56) References Cited

U.S. PATENT DOCUMENTS 8,508,244 B2    8/2013    Seguine
8,627,716 B2    1/2014    Son
8,860,683 B2    10/2014   Baumbach
(Continued)

FOREIGN PATENT DOCUMENTS

JP    H0621483 A    1/1994

*Primary Examiner* — Andre J Allen
(74) *Attorney, Agent, or Firm* — HP Inc. Patent Department

(57) ABSTRACT

An example system comprising a pressure sensor array, a proximity sensor comprising circuitry to sense an object approaching the pressure sensor array based on a change in a resonance frequency of the proximity sensor, and a controller to receive from the proximity sensor the sensed change in the resonance frequency and designate the pressure sensor array as active responsive to the sensed resonance frequency being below a threshold or inactive responsive to the sensed resonance frequency being above the threshold, wherein a data transmission rate of the active pressure sensor array is greater than a data transmission rate of the inactive pressure sensor array.

15 Claims, 3 Drawing Sheets

(56) References Cited

U.S. PATENT DOCUMENTS

| | | |
|---|---|---|
| 9,274,589 B2 | 3/2016 | Park |
| 9,857,394 B2 | 1/2018 | Gao |
| 2012/0197161 A1 | 8/2012 | Xia et al. |
| 2015/0091859 A1 | 4/2015 | Rosenberg |
| 2016/0302729 A1 | 10/2016 | Starr et al. |
| 2017/0265594 A1 | 9/2017 | Walker et al. |
| 2019/0026526 A1* | 1/2019 | Tang .................. G06V 40/1359 |
| 2022/0027017 A1* | 1/2022 | Ebisui ........................ G01L 5/00 |

* cited by examiner

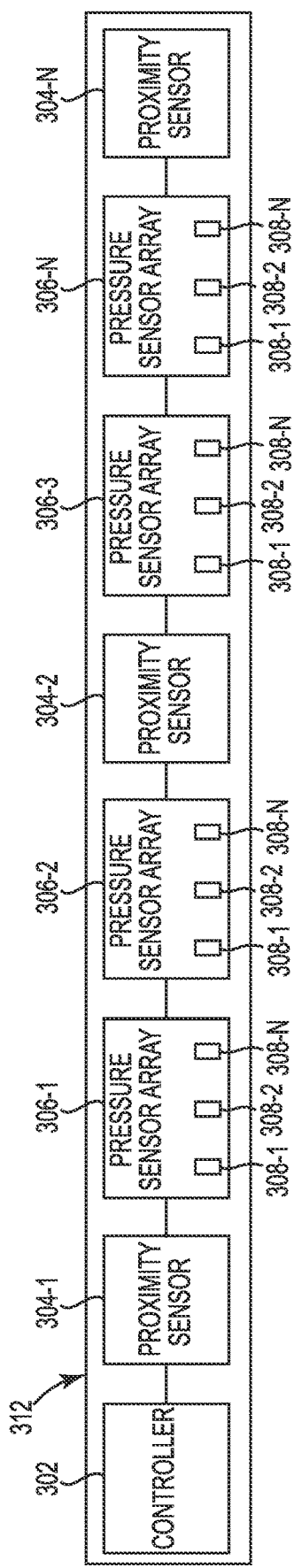
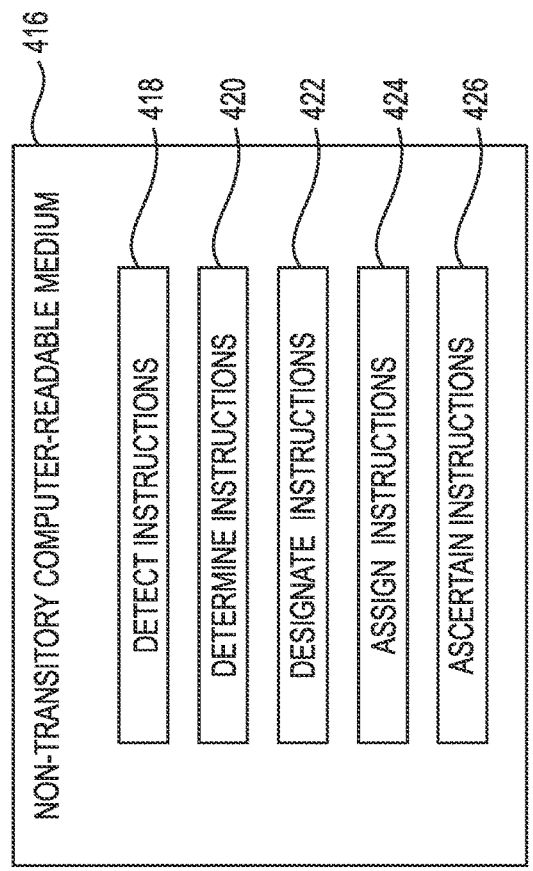
Figure 3
Figure 4

OBJECT DETECTION TO ACTIVIATE PRESSURE SENSORS

BACKGROUND

Pressure sensors can sense information about an object. For instance, pressure sensors can sense a presence of an object relative to the pressure sensor and/or an amount of pressure exerted by the object on the pressure sensors.

BRIEF DESCRIPTION OF THE DRAWINGS

FIG. 3 illustrates another example of a device including pressure sensors consistent with the disclosure.

FIG. 4 illustrates a non-transitory computer-readable medium employable with pressure sensors consistent with the disclosure.

DETAILED DESCRIPTION

Figure 1:
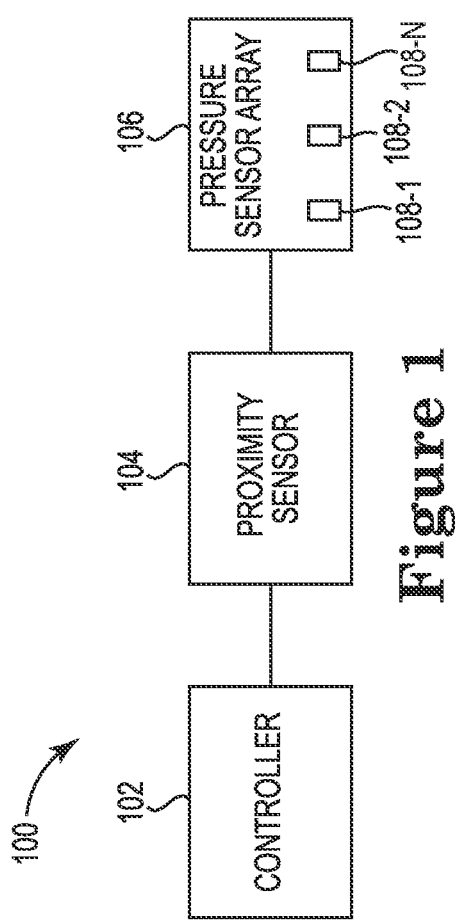
FIG. 1 illustrates a system including pressure sensors consistent with the disclosure.

Pressure sensors can measure the amount of force being exerted on the pressure sensors. As used herein, a force refers to an interaction that, when unopposed, will change the motion of an object. As used herein, an amount of force refers to a quantity of force an external object exerts on the pressure sensors. As used herein, pressure sensors are devices that can sense pressure and output an electrical signal based on that pressure. As used herein, pressure refers to a perpendicular force per unit area. For instance, a force applied to a pressure sensor can deform a compliant cell in the pressure sensor. As used herein, a compliant cell refers to a resilient and pliable component, such that the compliant cell can be able to return to the compliant cell's original shape after undergoing a deformation. Deformation of a compliant cell can indicate a change of pressure in the compliance cell. Further, an amount of the deformation of the compliant can correspond to a magnitude of an electrical signal output by the pressure sensor to indicate the amount of force exerted on the pressure sensor. As used herein, a magnitude refers to a numerical value. As used herein, the terms deform and deformation both refer to distorting a physical shape of an object.

As used herein, a pressure sensor array refers to a group of pressure sensors. For instance, a device can include pressure sensors throughout the device, and a pressure sensor array can include the pressure sensors in a portion of but not all of the device. As used herein, a proximity sensor refers to a sensor that can sense an object approaching the proximity sensor. For instance, if an object moves within a certain range of the proximity sensor, the proximity sensor will detect the approaching object.

Pressure sensors can be coupled to a scanning device. As used herein, a scanning device refers to equipment that can scan an object to receive information from the object. As used herein, the terms scan or scanning refer to receiving information about an object. For example, a scanning device can scan a compliant cell in a pressure sensor to receive information about any deformation and/or an amount of deformation of the compliant cell. The larger the area a scanning device has to scan, the longer the scan can take to complete. For example, scanning every pressure sensor in a pressure sensor array can take longer than scanning some but not all of the pressure sensors in the pressure sensor array. Moreover, scanning objects that are not relevant to a purpose of a particular scan can lead to a device receiving irrelevant data. The transmittal of irrelevant data can slow the transmittal of relevant data.

As such, some approaches may attempt to reduce a size of an area of a scan by first scanning all pressures sensor arrays to see which if any received contact from an object. Such approaches may then subsequently scan the pressure sensor arrays in an area where the object made contact to determine how much force the object exerted on the pressure sensor arrays. However, such approaches may rely on multiple scans which are computation intensive and/or time consuming relative to an individual scan.

Accordingly, the disclosure is directed to pressure sensors. For instance, a pressure sensor can use a proximity sensor to sense an object approaching the pressure sensor array based on a change in a resonance frequency of the proximity sensor, as described herein. As such, pressure sensors as detailed herein provide for a time and computationally efficient approach in contrast to other approaches that employ multiple scans and/or those approaches that scan every pressure sensor array to determine an amount of force imparted by an object.

FIG. 1 illustrates a system 100 including pressure sensors consistent with the disclosure. As illustrated in FIG. 1, the system 100 can include a controller 102, a proximity sensor 104, a pressure sensor array 106, and pressure sensors 108-1, 108-2, . . . , 108-N (collectively referred to herein as pressure sensors 108), among other components.

As mentioned, the pressure sensor array 106 can include pressure sensors 108. As used herein, pressure sensors can refer to sensors to sense the amount of force exerted by an object. In various examples, the pressure sensors 108 can include an inductor, a capacitor, and a compliant cell filled with electromagnetic fluid, though other types of pressure sensors are possible. As used herein, an inductor refers to an electrical component that can store energy in a magnetic field when electric current flows through the inductor. As used herein, a capacitor refers to an electrical component used to store an electric charge. The pressure sensors 108 can measure the force exerted on a pressure sensor array 106 by measuring the deformation of electromagnetic fluid caused by the force exerted on the electromagnetic fluid or otherwise measuring a pressure exerted. As used herein, electromagnetic fluid is a type of smart fluid in a carrier fluid, usually a type of oil whose properties can be changed when subjected to a change in an electromagnetic field. For instance, a smart fluid can experience a change in the smart fluid's apparent viscosity when subjected to a magnetic fluid.

The controller 102 can be a hardware component to designate the pressure sensor array 106 from which the system 100 is to receive data. For instance, the controller 102 can designate a certain pressure sensor array 106 as active while designating other pressure sensor arrays 106 as inactive. The active pressure sensor array 106 can transmit data about the amount of force being exerted on the pressure sensor array 106 at a data transmission rate greater than a data transmission rate of inactive pressure sensor arrays. As used herein, a data transmission rate refers to the speed of travel of an amount of data from one place to another. In some examples, the inactive pressure sensor arrays may not transmit data.

The proximity sensor 104 can be an inductor capacitor (LC) circuit. An LC circuit refers to an electric circuit including an inductor and a capacitor coupled together. LC circuits can store energy oscillating at the circuit's resonance frequency. As used herein, a resonance frequency is the frequency at which a circuit oscillates. In LC circuits, connecting an inductor across a charged capacitor will cause current to flow through the inductor, building up a magnetic field around the inductor and reducing the voltage of the capacitor. Eventually, the charge on the capacitor will dissipate and the voltage across the capacitor will be zero. However, the current will continue because inductors oppose changes in current. The current will begin to charge the capacitor with a voltage of opposite polarity to the capacitor's original charge. The energy used to charge the capacitor is extracted from the magnetic field. When the magnetic field is completely dissipated, the current will stop, and the charge will again be stored in the capacitor with the opposite polarity of the capacitor's previous charge. The cycle will begin again with the current flowing in the opposite direction through the inductor. The charge flows back and forth between the plates of the capacitor through the inductor. The energy oscillates back and forth between the capacitor and the inductor until the internal resistance makes the oscillations die out, unless the energy is replenished from an external circuit. An external circuit can apply alternating current to the LC circuit, driving continuous oscillations. If the applied current is the LC circuit's natural resonant frequency, resonance will occur.

The proximity sensor 104 can include a fixed inductor, a variable capacitor, and a fixed plate of the variable capacitor. As used herein, a fixed plate of a variable capacitor refers to a non-adjustable conductive plate in a capacitor. At least one conductive plate in the variable capacitor of proximity sensor 104 can be a fixed plate. Due to the fixed inductor and variable capacitor of the proximity sensor 104, the inductance of the proximity sensor can remain fixed while the capacitance of the proximity sensor 104 can vary. As used herein, variable capacitor refers to a capacitor whose capacitance can be changed intentionally and repeatedly through electrical and mechanical means. In some instances, the capacitance of variable capacitors can be changed by altering the distance between the parallel plates in the variable capacitor. The capacitance of a variable capacitor can also be changed by shifting the cross-sectional area at which the plates face one another. Variable capacitors can be used in LC circuits to set the resonance frequency.

The proximity sensor 104 can sense an approaching object. The proximity sensor 104 can sense the approaching object by detecting a change in the proximity sensor's 104 resonance frequency. When an object moves within a certain range of the proximity sensor 104, the capacitance of a proximity sensor 104 can increase. The increase in the capacitance can result in a decrease in the resonance frequency. The proximity sensor 104 can detect this decrease in resonance frequency. The resonance frequency and capacitance can vary as: an object varies in distance from the proximity sensor 104, and/or a total number of objects within an electromagnetic field varies. As used herein, an electromagnetic field refers to a physical field produced by electrically charged objects.

For example, if the resonance frequency of the proximity sensor 104 decreases below a threshold, the proximity sensor 104 can determine that an object is approaching the proximity sensor 104. As used herein, a threshold refers to a particular magnitude of a signal. Alternatively, if the capacitance increases above a certain threshold, the proximity sensor 104 can determine that an object is approaching the proximity sensor 104. This detection of an approaching object can cause the controller 102 to designate the pressure sensor array 106 corresponding to that proximity sensor 104 as active. If the resonance frequency does not decrease below a certain threshold, or the capacitance does not increase above a certain threshold, the controller 102 can designate the corresponding pressure sensor array 106 as inactive.

Pressure sensor array 106 can include pressure sensors 108 such as those including a compliant cell and an electromagnetic fluid within the compliant cell. The pressure sensors 108 can include a sensor plate to detect a deformation of the electromagnetic fluid. As used herein, a sensor plate refers to a material capable of sensing a pressure. A pressure sensor can further include a sealing layer disposed in between the compliant cell and the sensor plate to hermetically seal the electromagnetic fluid within the compliant cell.

The compliant cell can be a component such that the compliant cell can be able to return to the compliant cell's original shape after undergoing a deformation. The compliant cell can be hollow or have an inner cavity within which the electromagnetic fluid can be disposed. The compliant cell can have any suitable shape or structure so as to be able to receive an external force and be deformed from such a force. The compliant cell can have a suitably sized shape and structure, e.g., wall thickness, so as to be able to transfer such a deforming external force to the electromagnetic fluid within the compliant cell. A deformation of the compliant cell can cause a corresponding deformation of the electromagnetic fluid within the compliant cell.

The pressure sensor array 106 can sense the amount of force exerted on the pressure sensor array 106. The pressure sensor array 106 can sense the amount of force exerted by measuring the deformation of the compliant cell caused by the exerted force. The compliant cell can be filled with electromagnetic fluid. The electromagnetic fluid can be ferrofluid.

In various examples, every pressure sensor array 106 of a device can be operational when the device is receiving power. However, in some examples, a pressure sensor array 106 can transmit data obtained from the pressure sensor array 106 at a greater data transmission rate than inactive pressure sensor arrays.

Figure 2:
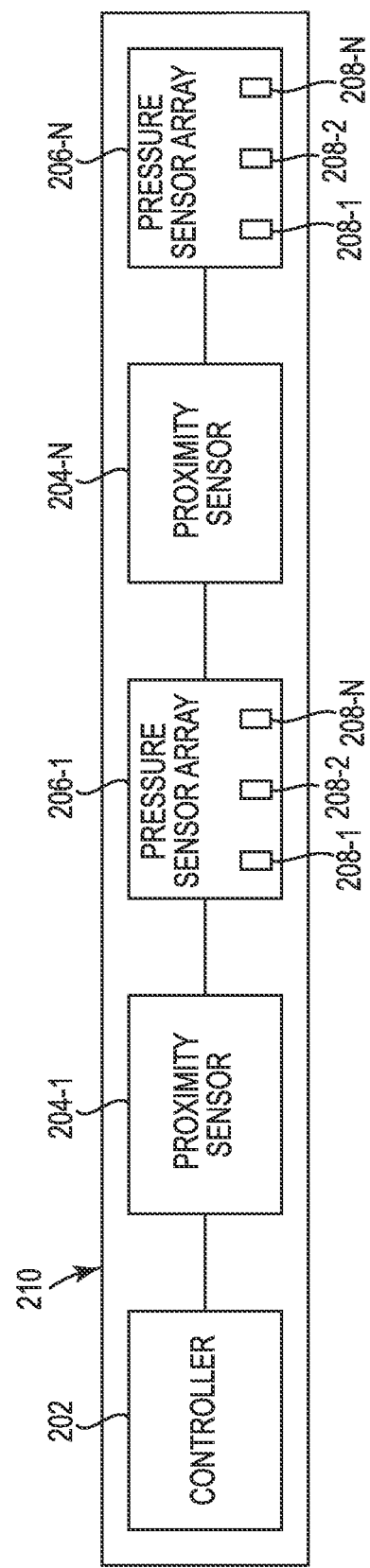
FIG. 2 illustrates a device including pressure sensors consistent with the disclosure.

FIG. 2 illustrates a device 210 including pressure sensors consistent with the disclosure. As illustrated in FIG. 2, the device 210 can include a controller 202, a plurality of proximity sensors 204-1, . . . , 204-N (collectively referred to as proximity sensors 204), a plurality of pressure sensor arrays 206-1, . . . 206-N (collectively referred to as pressure sensor arrays 206), and a plurality of pressure sensors 208-1, 208-2, . . . , 208-N (collectively referred to as pressure sensors 208).

The controller 202 can designate which pressure sensor arrays 206 are designated as active and/or inactive. For example, the controller 202 can receive information from a proximity sensor 204 stating that the proximity sensor has sensed an approaching object. The controller 202 can then designate the pressure sensor arrays 206 corresponding to that proximity sensor 204 as active.

In some examples, the pressure sensor arrays 206 can be coplanar with the proximity sensors 204 along a first axis. For example, the pressure sensor arrays 206 and the proximity sensors 204 can be coplanar along a horizontal axis. In other examples, the pressure sensor arrays 206 can be coplanar with the proximity sensors 204 along a second axis, such as a vertical axis.

The device 210 can be used in both two-dimensional (2D) and three-dimensional (3D) applications. A 2D application for device 210 can be a pressure mat, among other possibilities. A user can walk or run across the pressure mat depending on the application. The proximity sensors 204 in the pressure mat can sense where a user is about to contact the pressure mat (e.g., with a foot of the user), as described herein. The proximity sensors 204 can sense an approaching object based on a change in the resonance frequency of the proximity sensors 204. When any of the proximity sensors 204 senses an approaching object, those proximity sensors 204 can determine that a user is about to contact the pressure sensor arrays 206 corresponding to those proximity sensors 206. The controller 202 can then designate a pressure sensor array 206 as active. The proximity sensors 204 can be adjacent to the pressure sensor arrays 206. Data received from a user contacting the pressure mat can be transmitted at 200 Hertz (HZ).

A 3D application for the device 210 is in the field of robotics, among other possibilities. For instance, the device 210 can be used in the touch sensing of robotic arms and robotic fingers. Robotic arms can have thousands of sensors and this can lead to a vast amount of data to read. Device 210 can allow robotic devices to be designed to wait until the robotic device senses an object approaching the robotic arm or robotic hand before reading data from certain sensors. For example, the device 210 can be a 2D object, such as a sheet of material, and be applied to a 3D application by being wrapped around the arm of a robotic device. This can provide data about the surrounding environment of the robotic device such as information about objects proximate to the robotic device.

Some approaches to sensing the environment around a robotic device can include the use of optical sensors. As used herein, optical sensors refer to sensors that convert light or a change in light into an electrical signal. Unlike optical sensors, device 210 does not sense objects based on light. This makes readings from device 210 less susceptible to inaccuracies caused by changes in the lighting of the robotic device's current environment. Notably, pressure sensors as described herein can use less processing power approaches employing optical sensors.

FIG. 3 illustrates another example of a device including pressure sensors consistent with the disclosure. FIG. 3 is analogous or similar to FIG. 2. As illustrated in FIG. 3, the device 312 can include a controller 302, a plurality of proximity sensors 304-1, 304-2, . . . , 304-N (collectively referred to as proximity sensors 304), a plurality of pressure sensor arrays 306-1, 306-2, 306-3, . . . 306-N (collectively referred to as 306), and a plurality of pressure sensors 308-1, 308-2, . . . , 308-N. The proximity sensors 304 can detect an approaching object by measuring the decrease in resonance frequency or increase in capacitance caused by the approaching object. The object, for example, can be a human foot. Part of the electric field created by the capacitor in the proximity sensors 304 may not stay contained within the capacitor. Since the human body is grounded, some of the electric field created by the capacitor can stray from the proximity sensor 304 to the foot as the foot approaches the proximity sensor 304. This can cause the capacitance of the proximity sensor 304 to increase as the foot approaches the proximity sensor 304.

The controller 302, the plurality of proximity sensors 304, and the plurality of pressure sensor arrays 306 can be coplanar along a horizontal axis. In some examples, each pressure sensor array 306 has an adjacent proximity sensor 304 on a first side and an adjacent pressure sensor array 306 on a second side that is opposite of the first side. In this configuration, each pressure sensor array 306 corresponds to a proximity sensor 304.

FIG. 4 illustrates a non-transitory computer-readable medium 416 employable with pressure sensors consistent with the disclosure. The medium 416 can be a pressure sensor. Medium 416 can include a non-transitory machine readable medium 416 can store instructions, such as instructions 418, 420, 422, 424, and 426.

Non-transitory machine readable medium 416 can be electronic, magnetic, optical, or other physical storage device that stores executable instructions. Non-transitory machine readable medium 416 can be Random Access Memory (RAM), an Electrically-Erasable Programmable Read-Only Memory (EEPROM), a storage drive, an optical disc, and the like. In this example, the executable instructions 418, 420, 422, 424, and 426 can be installed on the device. Non-transitory machine-readable medium 416 can be a portable, external or remote storage medium that allows for the download of the instructions 418, 420, 422, 424, and 426 from the portable/external/remote storage medium.

Detect instructions 418 can include instructions to detect an object approaching the medium 416. For example, a sensor can detect when an object is within a certain range of the medium 416. For instance, the sensor can detect a proximity of an object due to an increase in the capacitance of the sensor, among other possibilities.

In some examples, detection instructions can include detecting the presence of an approaching object by measuring a change in resonance frequency. The proximity sensor can detect that an object is approaching by measuring the magnitude of change of the resonance frequency of the proximity sensor. If the change in resonance frequency is above a predetermined magnitude, the proximity sensor can determine that the proximity sensor detected an object. If the change in resonance frequency is below a predetermined magnitude, the proximity sensor can determine that the proximity sensor did not detect an object.

Determine instructions 420 can include instructions to determine a location at which an approaching object will exert force on the medium 416. More specifically, determine instructions 420 can include instructions to determine which pressure sensor arrays will receive the force from the approaching object. For example, the pressure sensor arrays to receive force from the approaching object can be determined by the corresponding proximity sensors. For instance, if a proximity sensor corresponding to a pressure sensor array detects an approaching object, that pressure sensor array is expected to receive force from the approaching object.

Designate instructions 422 can include instructions to designate certain pressure sensor arrays as active. Pressure sensor arrays can be designated as active responsive to a proximity sensor corresponding to the pressure sensor arrays detection of an approaching object. After being designated as active, the active pressure sensor arrays can transmit data at a greater data transmission rate than an inactive pressure sensor array.

In some examples, the medium 416 can include instructions (not illustrated) to sequentially designate certain pressure sensor arrays of the plurality of pressure sensor arrays as active or inactive responsive to an object traversing in a coplanar manner with a first axis. For example, an object can be detected by a first proximity sensor but move out of range of the first proximity sensor without exerting force on the corresponding pressure sensor array. While continuing to traverse, the object can move within range of a second proximity sensor and be detected by the second proximity sensor. The pressure sensor array corresponding to the first proximity sensor can be designated as inactive while the pressure sensor array corresponding to the second proximity sensor can be designated as active.

Assign instructions 424 can include instructions to assign certain pressure sensor arrays as inactive. Pressure sensor arrays can be assigned as inactive when a corresponding proximity sensor does not detect an approaching object. Pressure sensor arrays assigned as inactive can transmit data at a slower data transmission rate than an active pressure sensor array. In some examples, pressure sensor arrays assigned as inactive may not transmit data.

Ascertain instructions 426 can include instructions to ascertain the amount of force exerted on a pressure sensor array by an object. The amount of force exerted on the pressure sensor array by an object can be measured by measuring the deformation of a compliant cell in a pressure sensor array. The pressure sensor array determined by the proximity sensor to receive the force can be designated as active. The active pressure sensor array can transmit data about the amount of force exerted on the active pressure sensor array.

Figure 5:
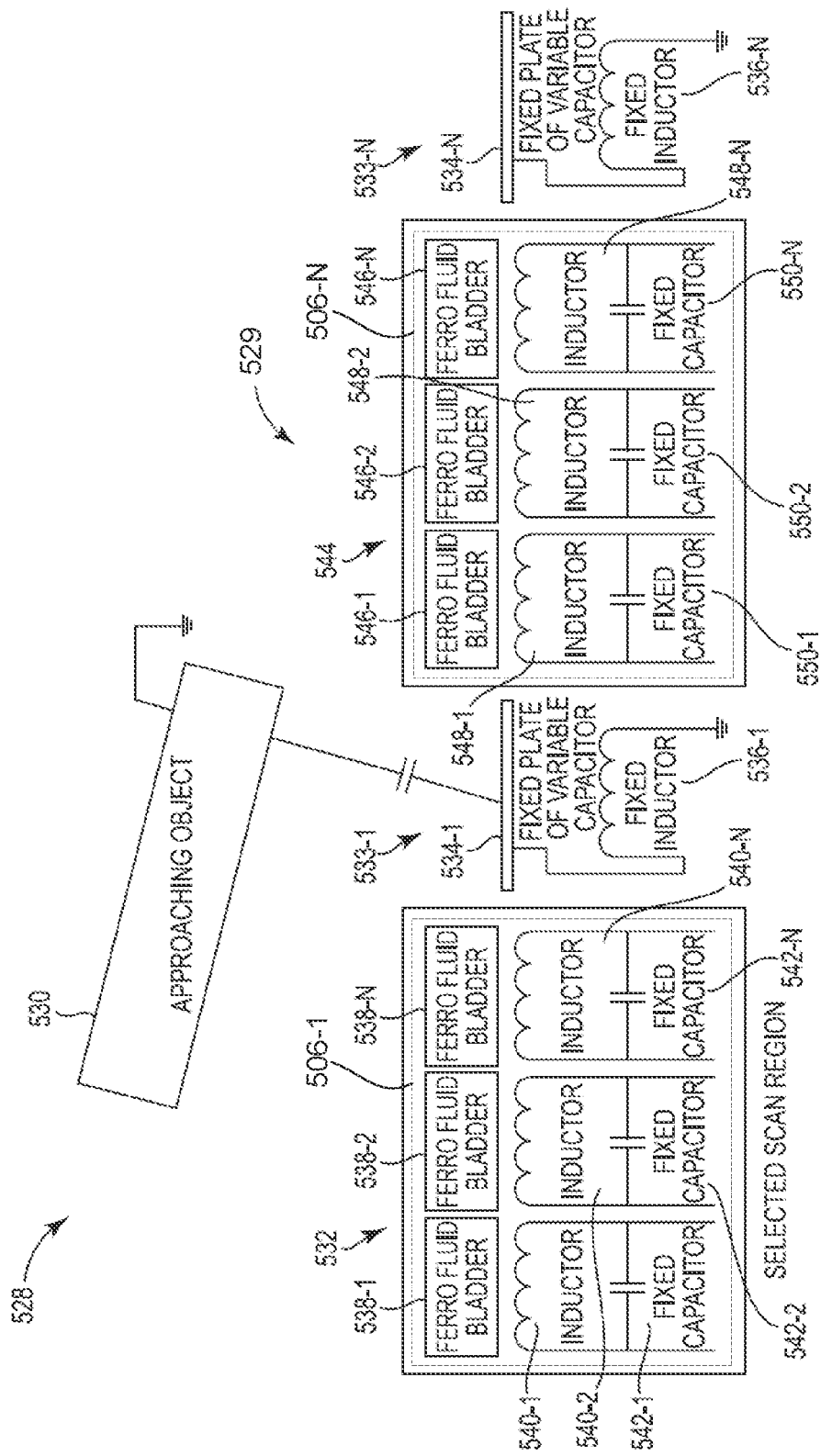
FIG. 5 illustrates a system including a pressure sensing device including pressure sensors consistent with the disclosure.

FIG. 5 illustrates a system 528 including a pressure sensing device 529 including pressure sensors to sense an object consistent with the disclosure. The system 528 can also include an approaching object 530. The pressure sensing device 529 can include pressure sensor arrays 506-1 and 506-N, among other elements. The pressure sensor arrays 506-1 and 506-N are analogous or similar to pressure sensor arrays 106, 206-1 and 206-N, and 306-1, 306-2, 306-3, and 306-N, as described in FIGS. 1, 2, and 3, respectively.

As used herein, a pressure sensing device refers to a device that can sense an approaching object and measure the amount of force the approaching object exerts on the pressure sensing device when the object makes contact with the pressure sensing device. As illustrated in FIG. 5, the pressure sensor array 506-1 can be included in an active region 532 whereas the pressure sensor array 506-N can be included in an inactive region 544. The active region 532 and the inactive region 544 can be determined, as detailed herein. While illustrated in FIG. 5 as having an individual pressure sensor array in each of the active region and the inactive region the disclosure is not so limited. Rather, any suitable number of pressure sensor arrays, pressure sensors, and/or proximity sensors can be included in an active region and/or an inactive region.

As illustrated in FIG. 5, the pressure sensor array 506-1 can include ferrofluid bladders 538-1, 538-2, . . . , 538-N (collectively referred to as ferrofluid bladders 538), inductors 540-1, 540-2, . . . , and 540-N (collectively referred to as inductors 540), fixed capacitors 542-1, 542-2, . . . , and 542-N (collectively referred to as fixed capacitors 542. Similarly, the pressure sensor array 506-N can include ferrofluid bladders 546-1, 546-2, . . . , 546-N (collectively referred to as ferrofluid bladders 546), inductors 548-1, 548-2, . . . , and 548-N (collectively referred to as inductors 548), fixed capacitors 550-1, 550-2, . . . , and 550-N (collectively referred to as fixed capacitors 550). Additionally, the pressure sensing device 529 can include proximity sensors 533-1, . . . , 533-N (collectively referred to as proximity sensors 533). The proximity sensors 533 can include a fixed plate of a variable capacitor 534-1, . . . , 534-N (collectively referred to as fixed plate of a variable capacitor 534), and a fixed inductor 536-1, . . . , 536-N (collectively referred to as 536).

The approaching object 530 can be an object moving within a certain distance of proximity sensor 533. As stated above, the approaching object 530 can be a human foot. As the foot approaches the proximity sensor 533, the capacitance of the proximity sensor 533 can increase and the resonance frequency of the proximity sensor 533 can experience a decrease. The proximity sensor 533 can detect an approaching object 530 by the change in resonance frequency and/or capacitance.

The pressure sensor array in the active region 532 includes ferrofluid bladders 538, inductors 540, and fixed capacitors 542. Fixed capacitors 542 have a fixed value of capacitance which cannot be adjusted. The ferrofluid in the ferrofluid bladders can exert an outward force on the ferrofluid bladders from inside the ferrofluid bladders. The pressure sensing device 529 can measure the amount of force the ferrofluid is exerting on the ferrofluid bladders. When external object exerts force on a ferrofluid bladder, the external object can deform the ferrofluid bladder and, therefore, change how the ferrofluid is exerting force on the ferrofluid bladder. An active pressure sensor array can measure the difference in force being exerted on the ferrofluid bladder by the ferrofluid due to an external force. This difference in force can be measured to determine how much force the object exerted on the pressure sensor.

As used herein, an active region refers to a region in the pressure sensing device 529 that the proximity sensor 533 anticipates will receive contact from an approaching object 530, as described herein. As mentioned, an active pressure sensor arrays can transmit data about the force exerted on the active pressure sensor at a faster rate than the data transmission rate of an inactive pressure sensor array.

The pressure sensor array in the inactive region 544 includes ferrofluid bladders 546, inductors 548, and fixed capacitors 550. The ferrofluid bladders 546 can be deformed by receiving force from an external object. The deformation can be measured to determine the amount of force exerted on the ferrofluid bladders 546. The inductors 548 and fixed capacitors 550 can couple together to form LC circuits.

As used herein, an inactive region refers to a region in the pressure sensing device 529 the proximity sensor 533 does not anticipate will receive contact from an approaching object 530. A proximity sensor 533 can assign a pressure sensor array as inactive if the corresponding proximity sensor 533 does not detect an approaching object 530. The pressure sensor array in the inactive region 544 can transmit data at a slower transmission rate than an active pressure sensor array. In some examples, the pressure sensor array in the inactive region 544 may not transmit data.

The figures herein follow a numbering convention in which the first digit corresponds to the drawing figure number and the remaining digits identify an element or component in the drawing. Elements shown in the various figures herein can be added, exchanged, and/or eliminated so as to provide a plurality of additional examples of the disclosure. In addition, the proportion and the relative scale of the elements provided in the figures are intended to illustrate the examples of the disclosure and should not be taken in a limiting sense.

What is claimed is:

1. A system comprising:
a pressure sensor array;
a proximity sensor comprising circuitry to sense an object approaching the pressure sensor array based on a change in a resonance frequency of the proximity sensor; and
a controller to:
receive from the proximity sensor the sensed change in the resonance frequency; and
designate the pressure sensor array as active responsive to the sensed resonance frequency being below a threshold or inactive responsive to the sensed resonance frequency being above the threshold, wherein, if the pressure sensor array is designated as active, a data transmission rate of the pressure sensor array is greater than the data transmission rate of the pressure sensor array if the pressure sensor array is designated as inactive.

2. The system of claim 1, wherein the proximity sensor includes a variable capacitor, a fixed plate of the variable capacitor, and a fixed inductor that together are to generate the resonance frequency of the proximity sensor.

3. The system of claim 1, wherein the resonance frequency of the proximity sensor is to vary as:
i) an object varies in distance from the proximity sensor;
ii) a total number of objects within an electromagnetic field varies; or
iii) a combination of i) and ii).

4. The system of claim 1, wherein the proximity sensor and the pressure sensor array are inductor capacitor tank circuits.

5. A pressure sensing device comprising;
a plurality of pressure sensor arrays;
a plurality of proximity sensors, wherein:
each proximity sensor of the plurality of proximity sensors includes a capacitor that is to resonate; and
each proximity sensor comprises circuitry to sense an object approaching the proximity sensor by sensing a change in a resonance frequency of the proximity sensor caused by the approaching object; and
a controller to:
receive proximity information from the proximity sensor that detects the object approaching the proximity sensor;
designate which regions of pressure sensors of pressure sensor arrays will be active regions and which regions of pressure sensor arrays will be inactive regions, wherein a data transmission rate of the active pressure sensor arrays is greater than a data transmission rate of the inactive pressure sensor arrays; and
receive information from the active regions.

6. The pressure sensing device of claim 5, wherein the pressure sensor arrays include electromagnetic fluid.

7. The pressure sensor arrays of claim 6, wherein the electromagnetic fluid is ferrofluid.

8. The pressure sensing device of claim 5, wherein each pressure sensor array has an adjacent proximity sensor.

9. The pressure sensing device of claim 5, wherein a pressure sensor array has an adjacent proximity sensor on a first side and an adjacent pressure sensor array on a second side that is opposite to the first side.

10. The pressure sensing device of claim 5, wherein the plurality of proximity sensors and the plurality of pressure sensor arrays are coplanar along a first axis.

11. The pressure sensing device of claim 5, wherein the plurality of proximity sensors and the plurality pressure sensor arrays are coplanar along a second axis.

12. A non-transitory computer-readable medium comprising instructions executable by a processor to:
detect a presence of an object approaching a pressure sensing device;
determine, based on a magnitude of change in a resonance frequency of a proximity sensor, a pressure sensor array that the object will contact, the pressure sensor array included in a plurality of pressure sensor arrays of the pressure sensing device;
designate the determined pressure sensor array as active;
assign the other of the pressure sensor arrays included in the plurality of pressure sensor arrays as inactive; and
ascertain an amount of force exerted by the object on the pressure sensing device by reading data from the active pressure sensor array.

13. The medium of claim 12, wherein the instructions further comprise instructions to ascertain the amount of force exerted by the object on the active pressure sensor array without reading or otherwise receiving data from inactive pressure sensor arrays.

14. The medium of claim 12, wherein instructions further comprise instructions to sequentially designate pressure sensor arrays of the plurality of pressure sensor arrays as active or inactive responsive to an object traversing in a coplanar manner with a first axis of the pressure sensing device.

15. The medium of claim 12, wherein the processor is to determine the pressure sensor array that the object will contact responsive to the magnitude of change of the resonance frequency being above a predetermined magnitude.

* * * * *